United States Patent
Kusawake et al.

(10) Patent No.: US 10,410,774 B2
(45) Date of Patent: Sep. 10, 2019

(54) COMPOSITE MATERIAL, MAGNETIC CORE FOR MAGNETIC COMPONENT, REACTOR, CONVERTER, AND POWER CONVERSION DEVICE

(71) Applicants: AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

(72) Inventors: Kazushi Kusawake, Osaka (JP); Atsushi Sato, Osaka (JP); Shigeki Masuda, Osaka (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/540,047

(22) PCT Filed: Jan. 26, 2016

(86) PCT No.: PCT/JP2016/052166
§ 371 (c)(1),
(2) Date: Jun. 27, 2017

(87) PCT Pub. No.: WO2016/125632
PCT Pub. Date: Aug. 11, 2016

(65) Prior Publication Data
US 2017/0365387 A1    Dec. 21, 2017

(30) Foreign Application Priority Data

Feb. 4, 2015 (JP) .................. 2015-020265

(51) Int. Cl.
*H01F 1/053* (2006.01)
*H01F 1/055* (2006.01)
(Continued)

(52) U.S. Cl.
CPC ......... *H01F 1/0533* (2013.01); *H01F 1/0558* (2013.01); *H01F 1/153* (2013.01);
(Continued)

(58) Field of Classification Search
CPC .... H01F 1/153; H01F 27/255; H01F 27/2823; H01F 1/26; H01F 27/24; H01F 37/00;
(Continued)

(56) References Cited

U.S. PATENT DOCUMENTS 6,278,192 B1 * 8/2001 Takigawa .............. H01L 23/293
257/787
2002/0016139 A1 * 2/2002 Hirokawa ............... B24B 37/24
451/54

(Continued)

FOREIGN PATENT DOCUMENTS

CN    101536121 A    9/2009
EP    2607420 A1    6/2013
(Continued)

OTHER PUBLICATIONS

Search Report for Int'l. Appln. No. PCT/JP2016/052166, dated Mar. 1, 2016.
(Continued)

*Primary Examiner* — Nguyen Tran
*Assistant Examiner* — Demetries A Gibson
(74) *Attorney, Agent, or Firm* — Honigman LLP

(57) ABSTRACT

Provided are a composite material having direct current superposition characteristics, low iron loss, and high strength, a magnetic core for a magnetic component and a reactor, the magnetic core and the reactor including the
(Continued)

composite material, a converter including the reactor, and a power conversion device including the converter. A composite material includes a soft magnetic powder, a filler, and a resin portion enclosing the soft magnetic powder and the filler dispersed therein, wherein the filler has rubber and an outer circumferential layer that covers a surface of the rubber and that contains an organic substance, and the resin portion contains a thermoplastic resin.

9 Claims, 4 Drawing Sheets

(51) Int. Cl.
   $H01F\ 1/26$ (2006.01)
   $H01F\ 27/24$ (2006.01)
   $H01F\ 27/255$ (2006.01)
   $H01F\ 37/00$ (2006.01)
   $H02M\ 3/155$ (2006.01)
   $H01F\ 1/153$ (2006.01)
   $H01F\ 27/28$ (2006.01)
   $H02M\ 3/158$ (2006.01)
   $H02M\ 7/537$ (2006.01)

(52) U.S. Cl.
   CPC .............. $H01F\ 1/26$ (2013.01); $H01F\ 27/24$ (2013.01); $H01F\ 27/255$ (2013.01); $H01F\ 27/2823$ (2013.01); $H01F\ 37/00$ (2013.01); $H02M\ 3/155$ (2013.01); $H02M\ 3/158$ (2013.01); $H02M\ 7/537$ (2013.01)

(58) Field of Classification Search
   CPC .... H01F 1/0533; H01F 1/0558; H01F 1/0578; H01F 1/083; H01F 1/14783; H01F 1/15383; H01F 1/28; H01F 1/37; H02M 3/158; H02M 7/537; H02M 3/155
   USPC ........................................ 252/62.54; 148/104
   See application file for complete search history.

(56) References Cited

U.S. PATENT DOCUMENTS

| 2002/0033561 | A1* | 3/2002 | Kawaguchi | C08K 3/0008 264/500 |
| 2010/0001226 | A1 | 1/2010 | Aramaki et al. | |
| 2010/0261038 | A1* | 10/2010 | Imaoka | B22F 1/02 428/800 |
| 2013/0222100 | A1* | 8/2013 | Nomura | H01F 27/025 336/55 |
| 2013/0322135 | A1* | 12/2013 | Kusawake | H01F 3/08 363/39 |
| 2014/0224466 | A1* | 8/2014 | Lin | B82Y 30/00 165/185 |
| 2015/0352956 | A1* | 12/2015 | Miuchi | B60K 35/00 701/41 |
| 2015/0352965 | A1* | 12/2015 | Inaba | H01F 37/00 363/131 |
| 2016/0012954 | A1* | 1/2016 | Noda | H01F 27/255 320/162 |
| 2016/0211061 | A1* | 7/2016 | Masuda | H05K 3/285 |
| 2016/0322150 | A1* | 11/2016 | Inaba | H01F 27/08 |
| 2017/0154719 | A1* | 6/2017 | Inaba | H01F 27/255 |
| 2017/0263356 | A1* | 9/2017 | Kusawake | H01F 1/147 |

FOREIGN PATENT DOCUMENTS

| JP | 2009-070885 A | 4/2009 |
| JP | 2009-094328 A | 4/2009 |
| JP | 2009-176974 A | 8/2009 |
| JP | 2011-181747 A | 9/2011 |
| JP | 2012-522884 A | 9/2012 |
| JP | 2015-126051 A | 7/2015 |
| WO | 2014156770 A1 | 2/2014 |

OTHER PUBLICATIONS

Office Action issued in Chinese Patent Application No. 201680003730.4 dated Jul. 3, 2018.

* cited by examiner ized, nonuniform dispersion of the soft magnetic powder may occur, and contact between powder particles may occur if the soft magnetic powder is a metal powder. These problems may result in a decrease in direct current superposition characteristics, an increase in eddy-current loss, a decrease in strength due to concentrated distribution of the soft magnetic powder, and the like.
COMPOSITE MATERIAL, MAGNETIC CORE FOR MAGNETIC COMPONENT, REACTOR, CONVERTER, AND POWER CONVERSION DEVICE

CROSS-REFERENCE TO RELATED APPLICATIONS

This application is the U.S. national stage of PCT/JP2016/052166 filed Jan. 26, 2016, which claims priority of Japanese Patent Application No. JP2015-020265 filed Feb. 4, 2015.

TECHNICAL FIELD

The present invention relates to a composite material used as a magnetic material for a magnetic component or the like that is provided with a coil and a magnetic core; a magnetic core for a magnetic component, the magnetic core including the composite material; a reactor, which is a magnetic component; a converter including the reactor; and a power conversion device including the converter. More particularly, the present invention relates to a composite material having excellent direct current superposition characteristics, low iron loss, and high strength.

BACKGROUND

Magnetic components provided with a coil having a winding portion formed by winding a wire and a magnetic core on which the coil is disposed are provided in various types of products such as automobiles, electrical equipment, and industrial machinery. Magnetic materials used for magnetic cores include a powder compact disclosed in, for example, JP 2009-070885A, and composite materials containing a soft magnetic powder and a resin that are disclosed in, for example, JP 2009-176974A and JP 2011-181747A.

JP 2009-070885A discloses a reactor as a magnetic component, and discloses a magnetic core including a powder compact and a plate-shaped gap material (spacer) made of a non-magnetic material such as alumina. This powder compact is manufactured by compression molding a metal magnetic powder coated with an insulating coating and then performing heat treatment on the compression-molded product to remove strain that has been introduced into the metal particles during compression molding. In JP 2009-070885A, it is stated that hysteresis loss of the powder compact can be reduced through the above-described heat treatment.

It is desired to develop a composite material having excellent direct current superposition characteristics, low iron loss (sum of hysteresis loss and eddy loss), and also excellent strength as a magnetic material for magnetic components or the like.

Here, a magnetic core of a magnetic component is desired to satisfy the following requirements: (A) it has excellent direct current superposition characteristics, or, in other words, changes in relative permeability are small from a low magnetic field up to a high magnetic field; (B) it has large saturation magnetization, or, in other words, it is unlikely to be magnetically saturated; and (C) it has excellent high-frequency characteristics, or, in other words, it has low iron loss in a high frequency range.

In a composite material containing a soft magnetic powder and a resin, the resin, which is a constituent ingredient, is generally a non-magnetic material, and the resin can therefore be regarded as a magnetic gap. Accordingly, if a magnetic core of a magnetic component is composed of the above-described composite material, unlike the case in which the magnetic core is composed of the above-described powder compact, the gap material can be omitted, and thus the magnetic core has the advantage of (A) having excellent direct current superposition characteristics. Moreover, with the above-described composite material, if the soft magnetic powder content is increased, (B) saturation magnetization can be increased.

However, when the filling ratio of the soft magnetic powder is increased, nonuniform dispersion of the soft magnetic powder may occur, and contact between powder particles may occur if the soft magnetic powder is a metal powder. These problems may result in a decrease in direct current superposition characteristics, an increase in eddy-current loss, a decrease in strength due to concentrated distribution of the soft magnetic powder, and the like.

Furthermore, as shown in a test example, which will be described later, it was found that, in the composite material, stress and the like that may be applied to the soft magnetic powder and the resin during the manufacturing process may cause an increase in iron loss and a decrease in strength. In this respect, in the case of the above-described powder compact, the hysteresis loss can be effectively reduced if heat treatment is performed at a particularly high temperature after performing compression molding. However, in the case of the composite material, heat treatment at a high temperature is difficult because the composite material contains resin. For this reason, it is desirable to obtain a composite material having excellent direct current superposition characteristics, low iron loss, and high strength without performing heat treatment.

In view of the above-described circumstances, the present invention provides a composite material having excellent direct current superposition characteristics, low iron loss, and high strength.

Moreover, the present invention provides a magnetic core for a magnetic component, the magnetic core having excellent direct current superposition characteristics, low loss, and high strength; a reactor including the magnetic core having excellent direct current superposition characteristics, low loss, and high strength; and a converter and a power conversion device that include the reactor.

SUMMARY OF THE INVENTION

A composite material according to an aspect of the present invention includes a soft magnetic powder, a filler, and a resin portion enclosing the soft magnetic powder and the filler dispersed therein. The filler has rubber and an outer circumferential layer that covers a surface of the rubber and that contains an organic substance. The resin portion contains a thermoplastic resin.

The above-described composite material has excellent direct current superposition characteristics, low iron loss, and high strength.

DESCRIPTION OF PREFERRED EMBODIMENTS

Figure 1:
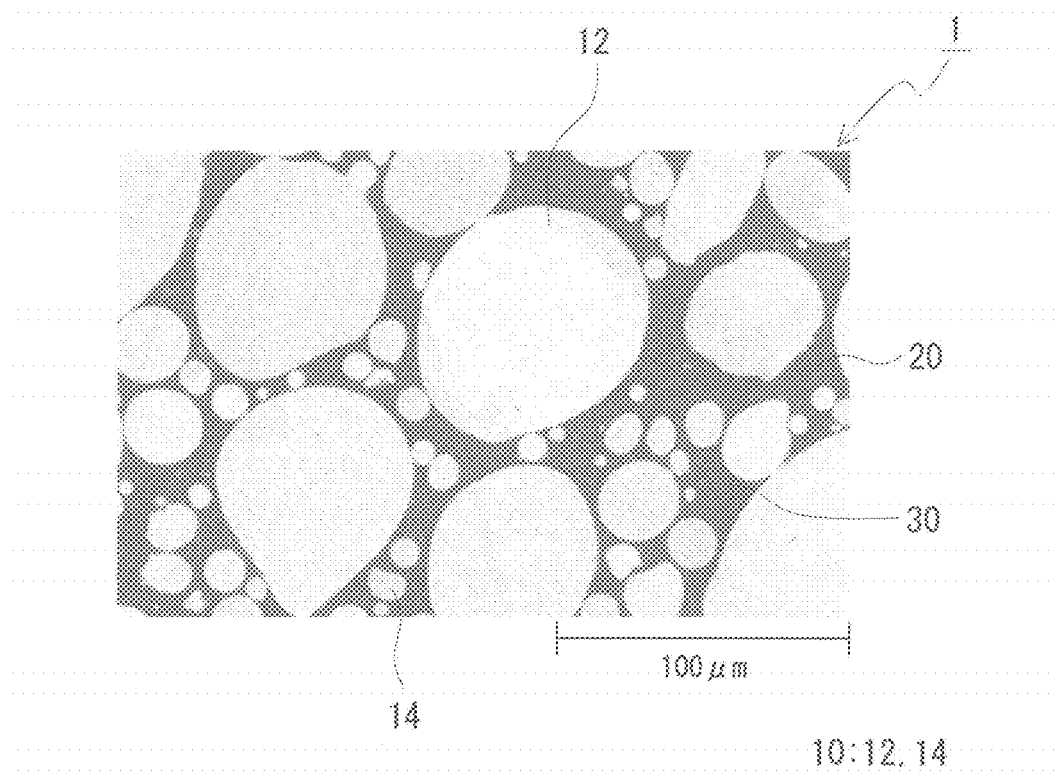
FIG. 1 is a scanning electron micrograph of an observed cross section of a composite material of Sample No. 1-1 produced in Test Example 1.

The inventors of the present invention have conducted intensive investigations of various composite materials containing a soft magnetic powder and a resin and having excellent direct current superposition characteristics, low iron loss, and high strength. As a result, it was found that a composite material containing a thermoplastic resin and being manufactured by adding an additive having a specific ingredient and a specific structure is preferable. In the obtained composite material, the additive is enclosed in a resin portion composed mainly of the thermoplastic resin and is present as a filler. The present invention is based on this finding. First, the details of aspects of the present invention will be listed and described.

(1) A composite material according to an aspect of the present invention includes a soft magnetic powder, a filler, and a resin portion enclosing the soft magnetic powder and the filler dispersed therein. The filler has rubber and an outer circumferential layer that covers a surface of the rubber and that contains an organic substance. The resin portion contains a thermoplastic resin.

The composite material has excellent direct current superposition characteristics, low iron loss, and high strength for the following reasons.

Direct Current Superposition Characteristics ($\alpha$) In the above-described composite material, the filler is disposed between powder particles of the soft magnetic powder, so that contact between the powder particles can be reduced even when the soft magnetic powder is filled to a high filling ratio, and the soft magnetic powder can be uniformly dispersed.

When the filler is contained, non-magnetic materials such as the filler and the resin portion are likely to be uniformly disposed between the powder particles of the soft magnetic powder. Also, when the additive containing rubber and having a specific structure is used as the raw material for the filler, shrinkage of the resin during solidification can be mitigated by elastic deformation of the rubber ingredient that is disposed between the powder particles, and the powder particles can be spaced apart from each other. Moreover, since the filler and the resin portion can be disposed between the powder particles, contact between the powder particles of the soft magnetic powder can also be suppressed. The above-described composite material is considered to have magnetic gaps that are uniformly disposed throughout the entire composite material. When the above-described composite material is used for a magnetic core of a magnetic component, the gap material made of alumina or the like can be omitted, and thereby changes in relative permeability can be made to be small from a low magnetic field up to a high magnetic field, so that the permeability of the magnetic core can be made constant.

Iron Loss ($\beta$) The configuration in which the filler containing rubber is present dispersed in the above-described composite material makes it possible to reduce strain that may be introduced into the powder particles of the soft magnetic powder due to stress that may be applied to the soft magnetic powder in the manufacturing process, and to reduce iron loss (mainly, hysteresis loss) that is caused by the strain.

It is considered that in the manufacturing process of the above-described composite material, mechanical stress that may be produced during kneading and the like, pressure during molding such as injection molding, stress due to shrinkage of the resin during solidification, and the like may be applied to the powder particles of the soft magnetic powder. It is considered that the above-described stress and the like that may be applied to the soft magnetic powder in the manufacturing process can be mitigated by using the additive containing rubber as the raw material for the filler and manufacturing the composite material in which the filler containing rubber is present in a dispersed state, and thereby strain that may be introduced into the soft magnetic powder can be reduced.

The above-described reason ($\alpha$) also constitutes the reason for low iron loss, because it is considered that since contact between the powder particles of the soft magnetic powder is suppressed, eddy-current loss can be reduced even when the soft magnetic powder contains a metal powder.

Strength

The above-described reason ($\alpha$) also constitutes the reason for high strength. If the soft magnetic powder is non-uniformly dispersed in the composite material, that is, if an aggregation portion of the soft magnetic powder is present in the composite material, the aggregation portion has excellent strength, but may also cause the formation of a resin concentrated portion in which a mass of the resin ingredient is present. The resin concentrated portion has relatively poor strength, and consequently, the strength of the composite material as a whole is reduced. The above-described composite material, in which the soft magnetic powder is uniformly dispersed, can have uniform strength throughout its entirety, and accordingly the composite material as a whole has excellent strength.

($\gamma$) The filler containing rubber is present dispersed in the above-described composite material.

When the resin shrinks during solidification in the manufacturing process, fine cracks may develop in the resin portion due to shrinkage. Using the additive containing rubber as the raw material for the filler as described above makes it possible to mitigate stress during shrinkage and reduce the development of fine cracks in the resin portion. Also, since the filler containing rubber is dispersed in the above-described composite material, it is possible to suppress, for example, the progression of a fine crack into a large crack when vibration, flexural stress, or the like is applied to the composite material.

($\delta$) The rubber of the filler and the resin portion are brought into intimate contact with each other by the outer circumferential layer.

The above-described composite material can be manufactured by using, as the above-described additive containing rubber, for example, a rubber powder having a two-layer structure including a core portion and a coating portion that has superior affinity for the resin than the core portion and that covers the core portion. At least a portion of the coating portion melts in the molten resin (ingredient constituting the resin portion after solidification) in the manufacturing process, and thus, in the above-described composite material, a region containing the ingredients of the coating portion and the ingredients of the resin portion is present so as to surround the rubber ingredient. The region containing the two ingredients, that is, the rubber and the organic substance other than the rubber constitutes the outer circumferential layer. That is to say, in the above-described composite material, the core portion of the rubber powder having the two-layer structure remains as a rubber particle of the filler, and the outer circumferential layer containing the organic substances such as the rubber and the resin is present around the rubber particle. At least a portion of the outer circumferential layer is derived from the above-described coating portion and is therefore in intimate contact with the rubber particle of the filler derived from the above-described core portion, and the other portion of the outer circumferential layer is derived from the resin portion and is therefore in intimate contact with the resin portion. As a result, the rubber particle of the filler in the above-described composite material can be brought into intimate contact with the resin portion via the outer circumferential layer, and thus the above-described composite material has excellent strength.

In addition, the above-described composite material has the following effects.

(i) Since the resin portion contains a thermoplastic resin, compared with cases in which only a thermosetting resin such as an epoxy resin is used, the soft magnetic powder is easily filled to a high filling ratio, and it is easy to increase the saturation magnetization.

(ii) Since a molding method such as injection molding can be used, even a complex shape that is difficult to manufacture through uniaxial press molding used in manufacturing the above-described powder compact can be manufactured with ease. Therefore, the degree of freedom of the shape is high, and also the ease of manufacturing is excellent.

(iii) Since the resin portion contains a thermoplastic resin, the melt mixture that is molded in the manufacturing process has excellent fluidity, the viscosity of the melt mixture is easy to adjust, and molding can be performed while applying pressure to a certain extent. For these and other reasons, filling into the shaping mold is easy even when the shaping mold has a complex shape. In this respect as well, the ease of manufacturing is excellent.

(2) As an example of the above-described composite material, according to an embodiment, particles of the filler that are present per cross-sectional area of 1200 μm² of the composite material may each be in intimate contact with the resin portion.

In this embodiment, all of the particles of the filler that are present within a specific cross-sectional area in any cross section of the composite material are in intimate contact with the resin portion, and thus the composite material has even more excellent strength. The composite material according to this embodiment can typically be manufactured by using, as the additive used as the raw material for the filler, a rubber powder having a two-layer structure and having excellent affinity for the resin, as described above.

(3) As an example of the above-described composite material, according to an embodiment, the composite material may contain the filler in an amount of more than 0 vol % and less than 7 vol %.

According to this embodiment, the composite material not only achieves the above-described effects by containing the filler, that is, reduction of contact between the powder particles of the soft magnetic powder, uniform dispersion of the soft magnetic powder, mitigation of stress on the soft magnetic powder and the resin portion, mitigation of shrinkage of the resin portion, and the like, but also has excellent moldability as a result of the filler content being within a specific range. The reason for this is that in the manufacturing process, a decrease in moldability (fluidity of materials) of the melt mixture that is caused by the additive being contained can be suppressed.

(4) As an example of the above-described composite material, according to an embodiment, the filler may contain at least one of a silicone rubber and an acrylic rubber.

A silicone rubber or an acrylic rubber may be used as the rubber contained in the filler. In particular, silicone rubber has excellent thermal resistance, and thus allows a thermoplastic resin having a high melting temperature to be used as the thermoplastic resin contained in the resin portion. A thermoplastic resin having a high melting temperature typically has excellent thermal resistance. Therefore, according to this embodiment, in the case where the composite material contains a silicone rubber, a thermoplastic resin having excellent thermal resistance can be selected, so that the composite material has excellent thermal resistance.

(5) As an example of the above-described composite material, according to an embodiment, the filler may have an average particle size of not less than 10 nm nor more than 10 μm.

According to this embodiment, since the particle size of the filler is within a specific range, the filler is likely to be more reliably disposed between the powder particles of the soft magnetic powder, and thus, the composite material satisfactorily achieves the above-described effects by containing the filler, that is, reduction of contact between the powder particles of the soft magnetic powder, uniform dispersion of the soft magnetic powder, mitigation of stress on the soft magnetic powder and the resin portion, mitigation of shrinkage of the resin portion, and the like.

(6) As an example of the above-described composite material, according to an embodiment, the soft magnetic powder may contain an alloy powder of an Fe-base alloy having an Si content of not less than 1.0 mass % nor more than 8.0 mass %.

The Fe-base alloy having an Si content within a specific range is hard, has excellent strength and stiffness, and furthermore, has high electrical resistance, as compared with pure iron, for example. According to this embodiment, such an alloy powder having high electrical resistance is contained, and thus it is easy to reduce the eddy-current loss even more. This embodiment is expected to make it easy to reduce the hysteresis loss even more by suppressing the introduction of strain in the manufacturing process by using such an alloy powder having high stiffness as the raw material. That is to say, this embodiment is expected to enable further reduction of iron loss.

(7) As an example of the above-described composite material, according to an embodiment, the composite material may contain the soft magnetic powder in an amount of not less than 30 vol % nor more than 80 vol %.

According to this embodiment, since a thermoplastic resin is contained, the soft magnetic powder can be filled to a high filling ratio that is equal to or close to the upper limit value of the above-described range, and furthermore, the saturation magnetization can be increased by filling the soft magnetic powder to such a high filling ratio. Moreover, even when the soft magnetic powder is filled to a high filling ratio, the composite material has excellent direct current superposition characteristics, low iron loss, and high strength as described above, as a result of containing the filler. When the soft magnetic powder content is not less than the lower limit value of the above-described range, it is easy to increase the saturation magnetization.

(8) As an example of the above-described composite material, according to an embodiment, the soft magnetic powder may have an average particle size of not less than 50 µm nor more than 300 µm.

According to this embodiment, since the size of the soft magnetic powder particles is within a specific range, an increase in the eddy-current loss due to excessively large powder particles can be suppressed, and furthermore, it is easy to increase the filling ratio. Thus, it is easy to reduce the eddy-current loss even more, and it is easy to increase the saturation magnetization even more. Also, when the size of the soft magnetic powder particles is within the specific range, it is easy to prevent the aggregation of the soft magnetic powder during the manufacturing process, so that the soft magnetic powder is likely to be more uniformly dispersed. In view of this, according to this embodiment, it is easy to make the direct current superposition characteristics more favorable, it is easy to reduce the eddy-current loss even more, and it is easy to increase the strength.

(9) A magnetic core for a magnetic component according to an aspect of the present invention includes the above-described composite material according to any one of the sections (1) to (8) above.

The magnetic core for a magnetic component includes the above-described composite material having excellent direct current superposition characteristics, low iron loss, and high strength, and therefore has excellent direct current superposition characteristics, low loss, and high strength.

(10) A reactor according to an aspect of the present invention includes a coil formed by winding a wire and a magnetic core on which the coil is disposed, wherein the magnetic core includes the composite material according to any one of the sections (1) to (8) above.

The reactor includes the above-described composite material having excellent direct current superposition characteristics, low iron loss, and high strength in the magnetic core, and therefore has excellent direct current superposition characteristics, low loss, high strength, and excellent magnetic properties, while being highly reliable in terms of strength.

(11) A converter according to an aspect of the present invention includes the reactor according to the section (10) above.

The converter includes the above-described reactor having excellent direct current superposition characteristics, low loss, and high strength, and therefore has excellent magnetic properties, while being highly reliable in terms of strength.

(12) A power conversion device according to an aspect of the present invention includes the converter according to the section (11) above.

The power conversion device includes the above-described converter constituted by the above-described reactor having excellent direct current superposition characteristics, low loss, and high strength, and therefore has excellent magnetic properties, while being highly reliable in terms of strength.

Details of Embodiments of the Present Invention

Figure 3:
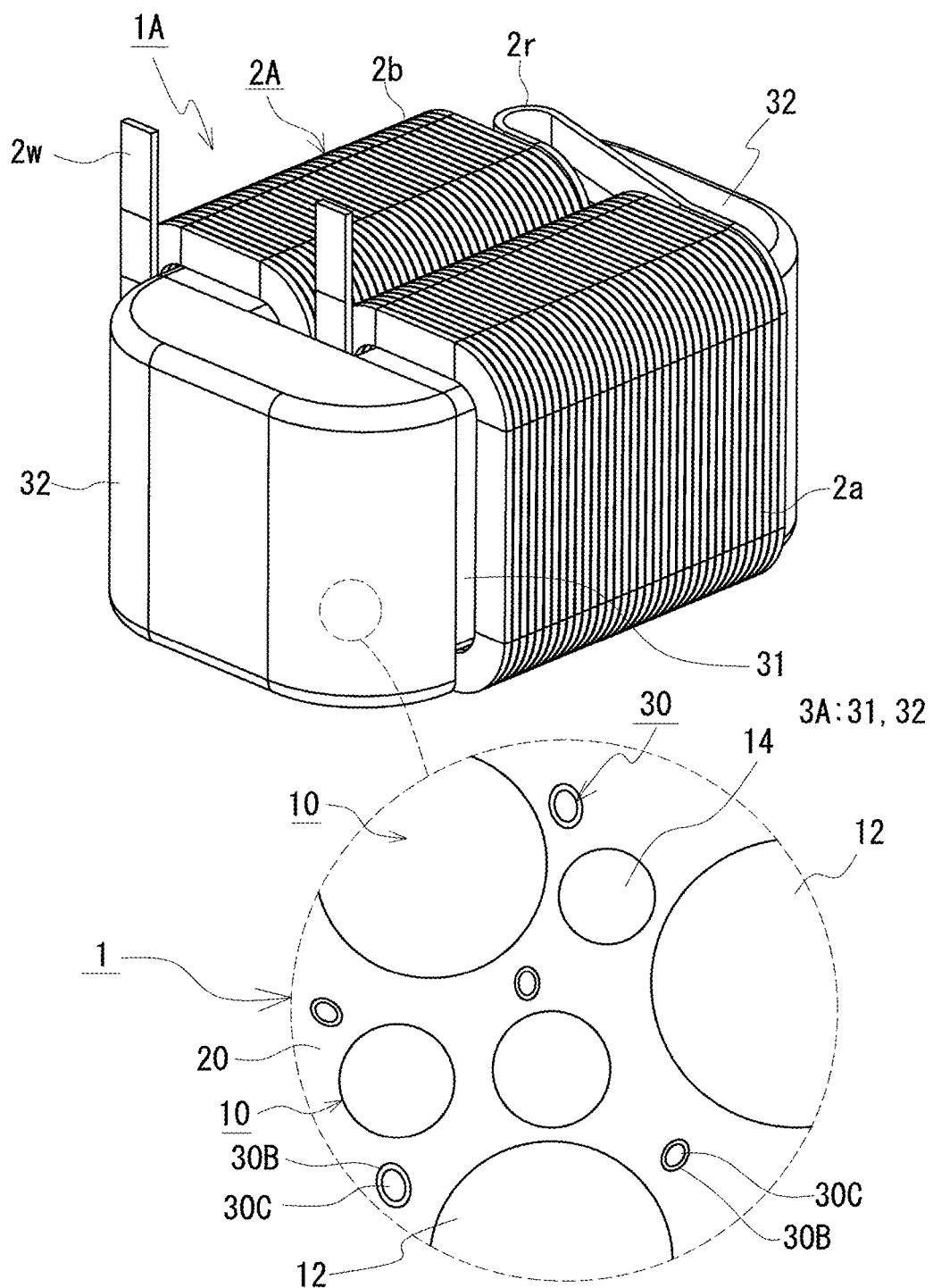
FIG. 3 is a schematic perspective view of a reactor according to an embodiment of the present invention including a composite material according to an embodiment of the present invention as a magnetic core.

Hereinafter, a composite material; a magnetic core for a magnetic component; a reactor, which is an example of the magnetic component; a converter; and a power conversion device according to embodiments of the present invention will be specifically described with appropriate reference to the drawings. In FIG. 3, the structure of a composite material 1 is schematically illustrated inside the dashed circle in order to facilitate understanding, but the actual size, shape, degree of filling, and the like may be different from those illustrated.

Composite Material

As shown in FIG. 1 and inside the dashed circle in FIG. 3, the composite material 1 according to an embodiment includes a soft magnetic powder 10, a filler 30, and a resin portion 20 enclosing the soft magnetic powder 10 and the filler 30 dispersed therein. One of the features of the composite material 1 of the embodiment is that the filler 30 contains a specific ingredient and has a specific structure, and the resin portion 20 contains a specific resin. Specifically, the filler 30 includes rubber particles 30C and outer circumferential layers 30B that are present around the respective rubber particles 30C. The resin portion 20 contains a thermoplastic resin. Hereinafter, these elements will be described one by one.

Soft Magnetic Powder

Composition

Soft magnetic metals and soft magnetic non-metals can be used as soft magnetic materials constituting powder particles 12 and 14 of the soft magnetic powder 10.

The soft magnetic metals include iron group metals, Fe-base alloys composed mainly of Fe, amorphous metals, and the like. Iron group metal elements are Fe, Co, and Ni.

The iron group metals are pure metals composed of an iron group metal element and unavoidable impurities, and may be, for example, pure iron containing Fe in an amount of 99.5 mass % or more.

As the Fe-base alloys, for example, Fe-base alloys having a composition containing, as an additional element, at least one element selected from Si, Ni, Al, Co, and Cr in a total amount of not less than 1.0 mass % nor more than 20.0 mass %, with the remainder including Fe and unavoidable impurities, can be used. Examples of such Fe-base alloys include Fe—Si based alloys, Fe—Ni based alloys, Fe—Al based alloys, Fe—Co based alloys, Fe—Cr based alloys, and Fe—Si—Al based alloys (Sendust).

The soft magnetic non-metals include metal oxides, for example, oxides containing Fe, such as ferrite.

With regard to the soft magnetic non-metals, many of the soft magnetic non-metals are electrical insulators or high-resistance materials, and an eddy current is less likely to be generated than in soft magnetic metals. Thus, the higher the soft magnetic non-metal content in the composite material 1, the more the eddy-current loss can be reduced. On the other hand, the iron group metals and the Fe-base alloys have high saturation magnetization, and may have low eddy-current loss depending on the composition. Therefore, it is preferable that the composite material 1 contains a soft magnetic metal powder, such as an iron group metal or an Fe-base alloy, as the soft magnetic powder 10.

In particular, when the soft magnetic powder 10 contains pure iron (Fe and unavoidable impurities) powder, the higher the pure iron powder content in the composite material 1, the easier it is to increase saturation magnetization, because Fe has high saturation magnetization.

In particular, when the soft magnetic powder 10 contains an Fe-base alloy powder, specifically an Fe—Si based alloy powder, the iron loss of the composite material 1 can be reduced even more, because an Fe—Si based alloy has high electrical resistivity, thereby making it easy to reduce eddy-current loss, and is also hard and unlikely to allow strain to be introduced therein during the manufacturing process, thereby making it easy to reduce hysteresis loss. The higher the amount of Si in a Si-containing Fe-base alloy, the higher the electrical resistivity, and the more likely the hardness is to be high. However, an excessively large amount of Si may result in a decrease in saturation magnetization. Taking low iron loss and high saturation magnetization into account, the amount of Si in the Fe—Si based alloy is preferably not less than 1.0 mass % nor more than 8.0 mass %, and furthermore, not less than 3.0 mass % nor more than 7.0 mass %.

In addition to a configuration in which the soft magnetic powder 10 is composed only of a single-composition powder, a configuration can also be adopted in which the soft magnetic powder 10 contains powders having multiple compositions. Specific examples of the latter configuration include, if the soft magnetic powder 10 is a soft magnetic metal powder, a configuration in which the soft magnetic powder 10 contains a pure iron powder and an Fe-base alloy powder and a configuration in which the soft magnetic powder 10 contains a plurality of types of Fe-base alloy powders having different compositions, as well as a configuration in which the soft magnetic powder 10 contains a soft magnetic metal powder and a soft magnetic non-metal powder.

Content

If the content of the soft magnetic powder 10 is somewhat low, and a sufficient amount of resin portion 20 is contained, when the composite material 1 is used for a magnetic core 3A, which will be described later, or the like, the gap material can be omitted, and excellent direct current superposition characteristics are obtained. Moreover, in this case, the resin portion 20 and the filler 30 can be sufficiently disposed between powder particles, and contact between powder particles can be suppressed. Consequently, reduction of an increase in the eddy-current loss that is caused by contact between the powder particles of the soft magnetic powder 10, and enhancement of the direct current superposition characteristics, reduction of the eddy-current loss, and enhancement of the strength due to uniform dispersion of the soft magnetic powder 10 can be expected. Moreover, the composite material 1 can have uniform magnetic properties and mechanical properties throughout its entirety.

Specifically, the soft magnetic powder 10 may be contained in an amount of not less than 30 vol % not more than 80 vol % with respect to 100 vol % of the composite material 1. When the content of the soft magnetic powder 10 is within this range, the composite material 1 provides excellent effects, such as the above-described high saturation magnetization, high strength, excellent direct current superposition characteristics, suppression of an increase in eddy-current loss, and uniform magnetic properties. Moreover, when the content of the soft magnetic powder 10 is within this range, during the manufacturing process, the melt mixture has excellent fluidity and is easily filled into a shaping mold, and thus the moldability is excellent. In this respect, the composite material 1 also has excellent ease of manufacturing. Taking the saturation magnetization, the strength, and the like into account, the content of the soft magnetic powder 10 is preferably not less than 50 vol %, and furthermore, not less than 60 vol %, not less than 65 vol %, and not less than 70 vol %. Taking the direct current superposition characteristics, the eddy-current loss, and the like into account, the content of the soft magnetic powder 10 is preferably not more than 75 vol % and, furthermore, not more than 73 vol %. The content of the soft magnetic powder 10 is more preferably not less than 65 vol % nor more than 75 vol %. For example, when the composite material 1 is composed of the following ingredients: soft magnetic powder 10: Fe-6.5% Si, resin portion 20: polyphenylene sulfide, and filler 30: silicone rubber filler (hereinafter, these constituent ingredients may be referred to as a blend a), a soft magnetic powder 10 content of not less than 30 vol % nor more than 80 vol % corresponds to a mass ratio of not less than about 74.5 mass % nor more than about 96.5 mass %.

Size

The smaller the size of the soft magnetic powder 10 particles in the composite material 1, the more likely the eddy-current loss is to decrease, and the easier it is to increase the filling ratio, making it more likely for the saturation magnetization to increase due to a high filling ratio. If the size of the soft magnetic powder 10 particles is somewhat large, aggregation can be prevented, and also the resin portion 20 and the filler 30 can be easily and sufficiently disposed between the powder particles, so that the soft magnetic powder 10 is likely to be uniformly dispersed. Due to the uniform dispersion of the soft magnetic powder 10, favorable direct current superposition characteristics, reduction of eddy-current loss, high strength, and uniform magnetic properties can be expected as described above.

A specific size of the soft magnetic powder 10 particles may be an average particle size of not less than 50 μm nor more than 300 μm. When the average particle size of the soft magnetic powder 10 satisfies this range, the composite material 1 provides excellent effects, such as the above-described reduction of eddy-current loss, high saturation magnetization, excellent direct current superposition characteristics, high strength, and uniform magnetic properties. Moreover, the melt mixture has excellent fluidity and is thereby easily filled into the shaping mold, and thus the moldability is excellent. In this respect, the composite material 1 also has excellent ease of manufacturing. The above-described average particle size is more preferably not less than 50 μm nor more than 100 μm.

Compared with a configuration in which the soft magnetic powder 10 is substantially composed of powder particles having a uniform size, a configuration in which the soft magnetic powder 10 contains relatively large powder particles 12 and relatively small powder particles 14 as shown in FIGS. 1 and 3 allows the small powder particles 14 to be disposed in gaps created by the large powder particles 12, thereby making it easy to increase the filling ratio, and thus, it is easy to increase the saturation magnetization. Moreover, gaps are likely to be created between the powder particles, and the filler 30 can be disposed in the gaps, so that the soft magnetic powder 10 is likely to be uniformly dispersed, and it is easy to achieve the above-described effects based on uniform dispersion of the soft magnetic powder 10.

Resin Portion

The resin portion 20 retains the soft magnetic powder 10, and is also disposed between the powder particles and functions as a magnetic gap. Furthermore, in the composite material 1 according to the embodiment, the resin portion 20 retains the filler 30 in a dispersed state, and also retains the outer circumferential layers 30B that are present around the respective rubber particles 30C (FIG. 3) of the filler 30. The outer circumferential layers 30B bring the resin portion 20 into intimate contact with the respective rubber particles 30C. Also, in the composite material 1 according to the embodiment, an extremely small number of, and preferably, as shown in FIG. 1, substantially no fine cracks are present in the resin portion 20.

Composition

In the composite material 1 according to the embodiment, the resin portion 20 contains a thermoplastic resin, and preferably is substantially composed of a thermoplastic resin. When the resin portion 20 is composed mainly of a thermoplastic resin, moldability is excellent during the manufacturing process, and thus the soft magnetic powder 10 can be filled to a high filling ratio. For example, the content of the soft magnetic powder 10 can be easily increased to 65 vol % or more (92.7 mass % or more in the above-described blend α). When the resin portion 20 is composed mainly of a thermoplastic resin, not only cast molding but also injection molding and the like can be used, so that even a complex shape can be easily and precisely molded, and therefore, the composite material 1 has excellent ease of manufacturing.

Specifically, polyamide (PA) resins, polyphenylene sulfide (PPS) resins, liquid crystal polymers (LCPs), polyimide (PI) resins, and fluororesins can be used as the thermoplastic resin. Examples of the PA resins include nylon 6, nylon 66, nylon 9T, and nylon 10T. In particular, PA resins such as nylon 9T, PPS resins, LCPs, and fluororesins, which are called engineering plastics, have excellent thermal resistance. Therefore, when the resin portion 20 contains nylon 9T or the like, the composite material 1 has excellent thermal resistance.

When the resin portion 20 contains a single type of thermoplastic resin, it is easy to adjust kneading conditions, molding conditions, and the like in the manufacturing process, and thus the ease of manufacturing is excellent. When the resin portion 20 contains a plurality of types of thermoplastic resins, the properties can be enhanced by combining thermoplastic resins having desired properties. For example, if a thermoplastic resin having superior fluidity is blended, while the properties intrinsic to the individual resins are secured, the fluidity can be enhanced, and consequently the composite material 1 has excellent ease of manufacturing. Moreover, the resin portion 20 can contain, for example, a cold-setting resin or the like, in addition to a thermoplastic resin. In this case, injection molding equipment can be simplified because heating of the materials and the mold can be mitigated or omitted, and, for example, the degree of freedom in choosing a molding method can be increased because molding methods other than injection molding, such as cast molding, which is performed by pouring a material into a mold, for example, can be used.

Content

Taking into account the direct current superposition characteristics, prevention of contact between the powder particles of the soft magnetic powder 10, uniform dispersion, and the like, the content of the resin portion 20 in the composite material 1 may be not less than 15 vol %, and furthermore, not less than 20 vol %, and not less than 25 vol % with respect to 100 vol % of the composite material 1. Taking the saturation magnetization and the like into account, the content of the resin portion 20 may be not more than 50 vol %, and furthermore, not more than 45 vol %, not more than 40 vol %, and not more than 35 vol %.

Filler

The composite material 1 according to the embodiment contains the filler 30. The filler 30 is typically granular, and is retained in a state in which it is dispersed in the resin portion 20. One of the functions of the filler 30 is the function of mitigating stress and the like that may be applied to the soft magnetic powder 10 and the resin portion 20 during the manufacturing process. In order to achieve this stress-mitigating function, the filler 30 contains rubber (rubber particles 30C), which is a material having high elastic deformation capability. Moreover, an additive containing rubber is used as the raw material that forms the filler 30. In this manner, strain that may be introduced into the soft magnetic powder 10, stress during thermal shrinkage that may be applied to the resin portion 20, and shrinkage itself of the resin portion 20 can be reduced in various steps, more specifically, the kneading step, the injection step, the resin solidification step, and the like of the manufacturing process.

Rubber

Specifically, silicone rubbers, acrylic rubbers, butadiene rubbers, urethane rubbers, fluororubbers, polysulfide rubbers, and the like can be used as the rubber. When the filler 30 contains rubber, depending on the particle size of the filler 30, excellent shock resistance (e.g., fine particles) or excellent stress-mitigating properties (e.g., coarse particles) are obtained. The excellent stress-mitigating properties make it easy to reduce the above-described strain and stress, so that the eddy-current loss and the hysteresis loss of the composite material 1 can be reduced, and fine cracks in the resin portion 20 can be made unlikely to develop. In particular, silicone rubber has excellent thermal resistance, and therefore, even when the resin portion 20 contains a thermoplastic resin having a high melting temperature like engineering plastics, the silicone rubber can satisfactorily remain in the resin portion 20 without being degraded during the manufacturing process.

In addition to a configuration in which the filler 30 is composed only of a powder containing a single-composition rubber, a configuration can also be adopted in which the filler 30 contains a powder containing rubbers having multiple compositions. In particular, it is preferable if the composite material 1 contains at least one of a silicone rubber and an acrylic rubber, because, in this case, the composite material 1 has excellent thermal resistance, and the resin portion 20 has extremely few fine cracks. Preferably, the composite material 1 includes the filler 30 containing in particular a silicone rubber.

Outer Circumferential Layer

The composite material 1 according to the embodiment includes the outer circumferential layers 30B that are present so as to cover the outer circumference of the respective rubber particles 30C. Each of the outer circumferential layers 30B is a region containing both ingredients of the resin portion 20 and ingredients of the rubber particle 30C, and is provided between the resin portion 20 and the rubber particle 30C. Due to the presence of the outer circumferential layer 30B, the rubber particle 30C is completely surrounded by and is brought into intimate contact with the ingredients (including the outer circumferential layer 30B) of the resin portion 20. In particular, it is preferable that in any cross section of the composite material 1, all of the particles of the filler 30 that are present per 1200 $\mu m^2$ of that cross section are in intimate contact with the resin portion 20. When all of the particles of the filler 30 are in intimate contact with the resin portion 20 with no gap and the like left between the resin portion 20 and the particles, the above-described effects of the composite material 1 containing the filler 30 can be satisfactorily obtained. It is considered that, when the composite material 1 is manufactured by using the above-described additive having the two-layer structure as the raw material, the outer circumferential layers 30B are typically formed as a result of at least a portion of the coating portion melting in the molten resin and the ingredients of the coating portion and the ingredients of the resin portion 20 mixing together. Therefore, the shape, thickness, and the like of the outer circumferential layers 30B are considered to be highly similar to the shape and thickness of the coating portion.

The outer circumferential layers 30B are extracted in the following manner, for example. A cross section of the composite material 1 is prepared, and the cross section is observed under a transmission electron microscope (TEM), or observed at a high magnification if a scanning electron microscope (SEM) is used, to analyze ingredients in the vicinity of the rubber particles 30C of the filler 30. The ingredient analysis is performed by conducting line analysis, for example. Through the ingredient analysis, a region substantially composed of the rubber ingredient is extracted as a rubber particle 30C, and a region that is sufficiently distanced away from the rubber particle 30C, for example, a region that is at least 100 nm away from the circumferential edge of the rubber particle 30C, and that is similarly distanced away from another rubber particle 30C and is substantially composed of the thermoplastic resin is extracted as a portion of the resin portion 20. An annular region containing both the above-described rubber ingredient and the thermoplastic resin is extracted from the circumferential edge of the extracted rubber particle 30C, and this annular region is determined to be an outer circumferential layer 30B. If the above-described annular region (outer circumferential layer 30B) surrounding the rubber particle 30C is present in the composite material 1, it is possible to presume that this composite material 1 has been manufactured using the above-described additive having the two-layer structure as the raw material.

Content

Another function of the filler 30 is the space-keeping function (spacer function) for uniformly dispersing the soft magnetic powder 10 in the resin portion 20 by being disposed between the powder particles of the soft magnetic powder 10. It is considered that when a large amount of filler 30 is contained, it is easier to achieve the above-described stress-mitigating effect and dispersion effect, but an excessively large amount of filler 30 may result in a decrease in the ratios at which the soft magnetic powder 10 and the resin portion 20 are contained, a decrease in moldability (fluidity of materials) of the melt mixture in the manufacturing process, and the like. Taking into account the stress-mitigating effect, the effect of suppressing shrinkage of the resin during solidification, the dispersion effect, the moldability, and the like, the content of the filler 30 is preferably more than 0 vol % and less than 7 vol % with respect to 100 vol % of the composite material 1. In the above-described blend α, this content of the filler 30 corresponds to a mass ratio of more than 0 mass % and less than about 1.47 mass %. In terms of the stress-mitigating effect, dispersion effect, and the like, the content of the filler 30 is more preferably not less than 1 vol %, and furthermore, not less than 1.5 vol %, and not less than 2 vol %. In terms of moldability and the like, the content of the filler 30 is more preferably not more than 6 vol % and, furthermore, not more than 5 vol %.

Size

When the particle size of the filler 30 is small, the filler 30 is disposed between the powder particles of the soft magnetic powder 10, thereby making it likely that the soft magnetic powder 10 is uniformly dispersed, and also is unlikely to inhibit an increase in the filling ratio of the soft magnetic powder 10, so that a composite material 1 in which, even though a sufficiently large amount of soft magnetic powder 10 is contained, the powder particles are uniformly dispersed can be obtained. It is considered that the composite material 1 in which the filler 30 itself is uniformly dispersed means that, in the manufacturing process, the additive was uniformly present, and stress was satisfactorily mitigated. Therefore, the hysteresis loss of the composite material 1 due to reducing the strain into the soft magnetic powder 10, the development of fine cracks in the resin portion 20, and the like can be effectively reduced. Moreover, when the particle size of the filler 30 is small, even if a fine crack develops in the composite material 1 when vibration, flexural stress, or the like is applied thereto, progression of the crack can be suppressed, and thus, a large crack is unlikely to develop. Taking into account the above-described dispersion effect, effect of suppressing the progression of a crack, and the like, the average particle size of the filler 30 is preferably not more than 10 μm, and furthermore, is more preferably not more than 8 μm, and not more than 5 μm. On the other hand, when the average particle size of the filler 30 is not less than 10 nm, the stress-mitigating effect, the dispersion effect, and the like can be achieved, and furthermore, it is expected that when the average particle size of the filler 30 is not less than 20 nm, not less than 30 nm, and not less than 50 nm, the stress-mitigating effect and the like can be sufficiently achieved.

The content of the outer circumferential layers 30B depends on the added amount of the additive having the two-layer structure that has been used, the size of the additive particles, the thickness of the coating portion, the manufacturing conditions of the additive, and the like, and is considered difficult to closely control. Since the content, size, and the like of the rubber particles 30C in the filler 30 can be roughly controlled by using the above-described added amount of the additive, size of the additive particles, manufacturing conditions of the additive, and the like, it is considered that if the content of the filler 30 and the size of the filler 30 particles satisfy the above-described specific ranges, the outer circumferential layers 30B can also be appropriately present.

Others

In addition to the soft magnetic powder 10, the resin portion 20, and the filler 30, the composite material 1 according to the embodiment can contain an inorganic material filler (not shown) made of a non-magnetic inorganic material such as ceramics, such as alumina, silica, or the like. The inorganic material filler contributes to enhancement of heat dissipation properties, uniform dispersion of the soft magnetic powder 10 due to the suppression of concentrated distribution thereof, and the like. When particles of the inorganic material filler are fine particles, the inorganic material filler can be disposed in gaps created by the powder particles of the soft magnetic powder 10, as in the case of the filler 30. That is to say, a decrease in the ratio at which the soft magnetic powder 10 is contained due to the presence of the inorganic material filler can be suppressed, and a composite material 1 having high saturation magnetization can be obtained. When the particles of an inorganic material filler are such fine particles that can be disposed in the above-described gaps, the composite material 1 resists cracking even if the filler is hard, and furthermore, since the composite material 1 contains the filler 30 having the stress-mitigating function, cracking and the like can be effectively suppressed. The inorganic material filler content is preferably not less than 0.2 mass % nor more than 20 mass %, and furthermore, is more preferably not less than 0.3 mass % nor more than 15 mass %, and not less than 0.5 mass % nor more than 10 mass %, with respect to 100 mass % of the composite material.

Methods for Measuring Various Physical Quantities and the Like

Measurement of various physical quantities of the composite material 1, such as compositions of the various elements, the content and the average particle size of the soft magnetic powder 10, the content of the resin portion 20, and the content and the average particle size of the filler, is performed by preparing a cross section of the composite material 1 and observing the cross section under a SEM or a TEM. The cross section of the composite material 1 can be obtained by cutting the composite material 1 using an appropriate tool, and then polishing the cut composite material 1. This cross section is observed under a SEM or a TEM to acquire an observation image. The magnification under a SEM may be, for example, not less than 200 times. The number of cross sections to be observed (number of observation images to be acquired) is not less than 10, one field of view is taken per screen, and the total cross-sectional area is not less than 0.1 cm$^2$. Each of the acquired observation images is subjected to image processing such as binarization processing to extract contours of the powder particles 12 and 14 of the soft magnetic powder 10, the filler 30, and the like, and thereby obtaining the areas defined by the respective contours.

Measurement of Content

The content (vol %) of the soft magnetic powder 10 with respect to the composite material 1 as a whole is regarded as being equivalent to the proportion of the area of the soft magnetic powder 10 in the cross section of the composite material 1. The proportion of the area of the soft magnetic powder 10 in the cross section of the composite material 1 as used herein means a value that is obtained by calculating the proportion of the area of the powder particles of the soft magnetic powder 10 for each observation image and averaging the calculated proportions of the area in at least ten observation images. As in the case of the soft magnetic powder 10, the content (vol %) of the filler 30 with respect to the composite material 1 as a whole is regarded as being equivalent to the proportion of the area of the filler 30 in the cross section of the composite material 1. The proportion of the area of the filler 30 also means an average value of the proportions of the area of the filler 30 in at least ten observation images, as in the case of the soft magnetic powder 10.

Measurement of Average Particle Size

The average particle size of the soft magnetic powder 10 is measured in the following manner. For each observation image, contours of all the powder particles that are present in that observation image are extracted, and a particle size distribution is obtained by using the diameters of equivalent-area circles whose areas are equivalent to the areas of the extracted contours as particle sizes. A peak value of the particle size distribution is obtained for each observation image, and an average value of the peak values of at least ten observation images is used as the average particle size. The average particle size of the filler 30 is measured in the same manner as in the case of the soft magnetic powder 10: a particle size distribution is obtained by using the diameters of equivalent-area circles whose areas are equivalent to the extracted contours of the outer circumferential layers 30B as particle sizes, and an average value of peak values of the particle size distributions of at least ten observation images is used as the average particle size.

Ingredient Analysis

Ingredients of the soft magnetic powder 10 can be analyzed using X-ray diffraction, energy-dispersive X-ray spectroscopy (EDX), or the like. Ingredients of the resin portion 20 and the filler 30 can be analyzed using EDX or the like.

Shape

Figure 4:
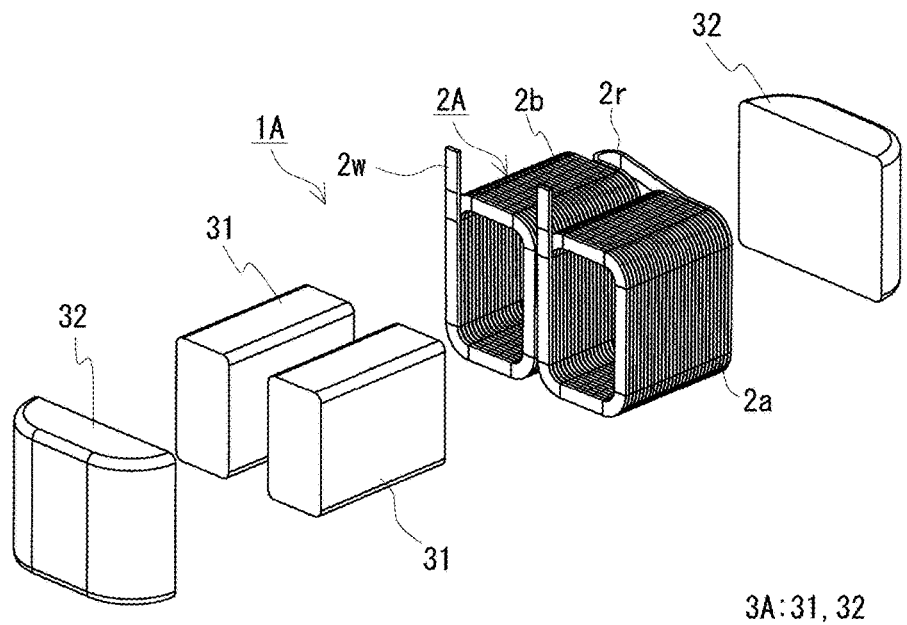
FIG. 4 is an exploded perspective view of the reactor according to the embodiment shown in FIG. 3.

The composite material 1 according to the embodiment can be manufactured using various types of molding methods, such as injection molding and cast molding, and thereby have various shapes. FIG. 4 shows rectangular parallelepiped shapes (core pieces 31) and modified column shapes (core pieces 32) having dome-shaped end surfaces. However, these shapes are shown for illustrative purposes only, and there is no limitation on the shape of the composite material 1. A shaping mold can be selected so as to form the composite material 1 into a desired shape. In addition to the column shapes shown in FIG. 4, the composite material 1 may have not only simple three-dimensional shapes such as a tubular shape having a through hole, for example, a torus shape, but also other complex three-dimensional shapes. Other specific shapes will be described in the section of Core for Magnetic Component.

Uses

The composite material 1 according to the embodiment can be preferably used for a magnetic core for use in a magnetic component. The magnetic component includes a coil having a tubular winding portion formed by helically winding a wire and the magnetic core having a portion on which the winding portion is disposed. Examples of the magnetic component include reactors, choke coils, transformers, and motors. FIGS. 3 and 4 show a reactor 1A as an example of the magnetic component.

Method for Manufacturing Composite Material

As described above, the composite material 1 according to the embodiment can be manufactured using various molding methods such as injection molding and cast molding. In particular, since the composite material 1 contains a thermoplastic resin in the resin portion 20, injection molding can be preferably used.

Raw Materials

Raw materials for the composite material 1 include, for example, the soft magnetic powder 10; a raw material resin, such as a resin powder or a resin melt of a thermoplastic resin, the raw material resin finally constituting the resin portion 20; and an additive having a two-layer structure, the additive finally forming the rubber particles 30C and the outer circumferential layers 30B of the filler 30.

The soft magnetic powder 10 used as the raw material substantially maintains its composition, size of its particles, and content in the composite material 1 after solidification. That is to say, the composition, size of the particles, and content of the soft magnetic powder 10 remain substantially unchanged before and after manufacturing the composite material 1. Therefore, the raw material can be selected and adjusted so that desired composition, average particle size, content, and the like of the soft magnetic powder 10 in the composite material 1 can be obtained. However, as described in "Methods for Measuring Various Physical Quantities and the Like" above, the content of the soft magnetic powder 10 in the composite material 1 is a value that is obtained by using a measurement method different from a measurement method used in the raw material phase, and thus may deviate from the value of the raw material. If the difference of the measurement result of the content of the soft magnetic powder 10 in the composite material 1 from the amount of soft magnetic powder 10 that is added as the raw material is within ±5%, the content of the soft magnetic powder 10 in the composite material 1 is regarded as substantially maintaining the value of the raw material (being substantially equal to that of the raw material).

A portion of the raw material resin constitutes the outer circumferential layers 30B in the composite material 1 after solidification.

The additive having the two-layer structure and used as the raw material is a powder of a rubber material, the powder including, as described above, a core portion that is composed of a rubber and a coating portion that is composed of a rubber having the same main ingredient as that of the rubber constituting the core portion and that covers the core portion. The rubber constituting the coating portion is adjusted so as to have superior affinity for the raw material resin than the rubber constituting the core portion. Commercially available or known additives can be used as such an additive having the two-layer structure. It is considered that the core portion of the additive having the two-layer structure mainly constitutes each rubber particle 30C of the filler 30 in the composite material 1 after solidification, and the coating portion mainly constitutes each outer circumferential layer 30B. Thus, depending on the generated state of the outer circumferential layers 30B, the average particle size of the filler 30 in the composite material 1 may be small or the content of the filler 30 in the composite material 1 may be small, relative to those of the additive having the two-layer structure. The content, manufacturing conditions, and the like of the additive and the raw material resin can be adjusted so that a desired composition, average particle size, content, and the like of the filler 30 in the composite material 1 can be obtained. If the difference of the measurement result of the content of the filler 30 in the composite material 1 from the added amount of the additive having the two-layer structure and used as the raw material is within ±1%, the content of the filler 30 in the composite material 1 is regarded as substantially maintaining the value of the raw material (being substantially equal to that of the additive as the raw material).

With regard to the average particle size of each powder used as the raw material, a particle size value (hereinafter referred to as "D50 particle size") at which, when a volume-based particle size distribution is measured using a laser diffraction type particle size distribution measurement device, the cumulative volume of particles from the small particle size side reaches 50% is used. The measurement results of the average particle size of the soft magnetic powder 10 and the average particle size of the filler 30 described above may deviate from respective D50 particle sizes. In particular, it is considered that, compared with the average particle size of the additive having the two-layer structure and used as the raw material, the average particle size of the filler 30 is small. If the difference of the above-described measurement result of the average particle size from the D50 particle size, that is, [(D50 particle size−measurement result)/D50 particle size]×100 is within ±5% in the case of the soft magnetic powder 10 and within ±1% in the case of the filler 30, the average particle size is regarded as substantially maintaining the size of the raw material powder particles (being substantially equal to that of the raw material powder).

Injection Molding

When the composite material 1 is manufactured through injection molding, manufacturing is performed in the following manner, for example. Of a powder mixing step and a kneading step, the powder mixing step can be omitted and only the kneading step is performed.

(Preparing step) The soft magnetic powder 10, the resin powder of a thermoplastic resin, and the above-described additive having the two-layer structure are prepared as the raw materials.

(Powder mixing step) The powders of the prepared raw materials are mixed to obtain a mixed powder.

(Kneading step) The mixed powder is heated, and kneaded in a state in which the resin powder is molten.

(Solidification step) The kneaded product (e.g., pellets) is supplied to an injection molding device and plasticized, and the melt mixture is injected and filled into a shaping mold, and then solidified through cooling.

Cast Molding

In cast molding, a melt mixture obtained by mixing and kneading the soft magnetic powder and the molten thermoplastic resin together is filled into a shaping mold while applying pressure if necessary, and is then solidified.

Effects of Manufacturing Method

The following effects are achieved by using the above-described additive having the two-layer structure in which the rubber constitutes the core portion in manufacturing the composite material 1 of the embodiment. As a result, as described above, a composite material 1 having excellent direct current superposition characteristics, low iron loss, and high strength, and furthermore, a composite material 1 having also high saturation magnetization can be manufactured.

(I) In the powder mixing step, the kneading step in which the resin powder is in a molten state, an injection step, and the solidification step, stress and the like that may be applied to the soft magnetic powder 10 due to pressure during filling into a mixer or the shaping mold, thermal shrinkage of the resin, and the like can be mitigated, and the introduction of strain into the soft magnetic powder 10 due to the above-described stress and the like can be effectively reduced.

(II) Stress and the like that may be applied to the resin portion 20 after solidification due to thermal shrinkage of the resin in the solidification step can be mitigated, and thus, the development of fine cracks due to the above-described stress and the like can be effectively reduced.

(III) The additive having the two-layer structure functions as a spacer between the powder particles of the soft magnetic powder 10, and thus, even when the soft magnetic powder 10 is filled to a high filling ratio, the additive prevents aggregation of the powder particles and can contribute to uniform dispersion of the soft magnetic powder 10 in the resin portion 20. Moreover, shrinkage of the resin during solidification is suppressed by the additive being disposed between the powder particles, so that the filler 30 can be disposed between the powder particles, and the soft magnetic powder can be uniformly dispersed.

(IV) The ingredients of the coating portion having excellent affinity, of the additive having the two-layer structure, and the ingredients of the resin portion 20 in the molten state mix together, and thus, after solidification, the resin portion 20 and the rubber particles 30C of the filler 30 can be brought into intimate contact with each other via the respective outer circumferential layers 30B.

Test Example 1

Composite materials each containing a soft magnetic powder and a resin portion were produced, and the magnetic properties and the strength of the obtained composite materials were examined.

Raw Materials and Manufacturing Process

In this test, for all of the samples, composite materials were produced by using injection molding. The samples were produced by performing a raw material preparing step, a mixing and kneading step, an injection step, and a cooling step in this order.

For Sample Nos. 1-1 to 1-4, a soft magnetic powder, a resin powder, and an additive having a two-layer structure were prepared as the raw materials.

For Sample Nos. 1-100, 1-110, and 1-120, a soft magnetic powder and a resin powder were prepared as the raw materials, and no additive having a two-layer structure was used. Apart from the fact that no additive was used, Sample No. 1-100 was manufactured using the same raw materials as Sample Nos. 1-1 and 1-2, Sample No. 1-110 was manufactured using the same raw materials as Sample No. 1-3, and Sample No. 1-120 was manufactured using the same raw materials as Sample No. 1-4, and manufacturing was performed under the same conditions.

Specifications of Raw Materials

Fe—Si alloy powders (Fe-3Si, Fe-6.5Si) having respective compositions containing Si in an amount of 3.0 mass % or Si in an amount of 6.5 mass %, with the remainder being constituted by Fe and unavoidable impurities, were used as the soft magnetic powder. Both of the powders having the respective compositions had a D50 particle size of 80 μm.

A polyamide resin, more specifically, nylon 9T (PA9T), or a PPS was used as the resin portion.

The additive used for Sample Nos. 1-1, 1-3, and 1-4 was a powder constituted by particles having a two-layer structure including a core portion and coating portion made of a silicone rubber, and its average particle size satisfied a range of not less than 100 nm nor more than 900 nm. For example, MR-01 manufactured by Kaneka Corporation can be used.

The additive used for Sample No. 1-2 was a powder constituted by particles having a two-layer structure including a core portion and coating portion made of an acrylic rubber, and its average particle size satisfied a range of not less than 1 μm nor more than 9 μm. For example, MP-91 manufactured by Kaneka Corporation can be used.

The prepared soft magnetic powder, resin powder, and additive powder, as appropriate, serving as the raw materials were mixed, the mixture was further heated to bring the resin into a molten state and was then kneaded, and thus a kneaded product was produced. Table 1 shows the blend ratios (filling ratio for the soft magnetic powder) of the raw materials. The blend ratios were indicated in terms of volume ratio (vol %) with respect to 100 vol % of the whole of the raw materials. The remainder of the blend ratios shown in Table 1 corresponds to the ratio of the resin portion.

TABLE 1

| Sample No. | Filling ratio of soft magnetic powder Composition | vol % | Additive Composition | Average particle size | Blend ratio vol % | Resin portion | Moldability |
|---|---|---|---|---|---|---|---|
| 1-100 | Fe—3Si | 70 | — | — | — | PA9T | Very Good |
| 1-1 | Fe—3Si | 70 | Silicone rubber | 100-900 nm | 3 | PA9T | Very Good |
| 1-2 | Fe—3Si | 70 | Acrylic rubber | 1-9 μm | 5 | PA9T | Good |
| 1-110 | Fe—6.5Si | 72 | — | — | — | PA9T | Very Good |
| 1-3 | Fe—6.5Si | 72 | Silicone rubber | 100-900 nm | 3 | PA9T | Very Good |
| 1-120 | Fe—6.5Si | 72 | — | — | — | PPS | Very Good |
| 1-4 | Fe—6.5Si | 72 | Silicone rubber | 100-900 nm | 3 | PPS | Very Good |

Shape and Size of Samples

A shaping mold having a predetermined shape was prepared, the kneaded product was plasticized, filled into the shaping mold, and then cooled and solidified to produce a composite material. In this test, for each sample, two types of test pieces, a ring-shaped composite material serving as a test piece for measurement of magnetic properties and a plate-shaped composite material serving as a test piece for measurement of strength were produced. The size of the ring-shaped composite material was set as follows: outer diameter: 34 mm, inner diameter: 20 mm, and thickness: 5 mm. The size of the plate-shaped composite material was set as follows: length: 77 mm, width: 13 mm, and thickness: 3.2 mm.

Moldability (Fluidity of Materials)

The fluidity of the materials during filling of the kneaded product into the shaping mold was examined. Table 1 shows the results. It should be noted that with respect to Sample No. 1-2, when the blend ratio of the additive was changed from 5 vol % to 7 vol %, the kneaded product had poor fluidity and was not be able to be precisely molded.

Observation of Structure of Samples

Figure 2:
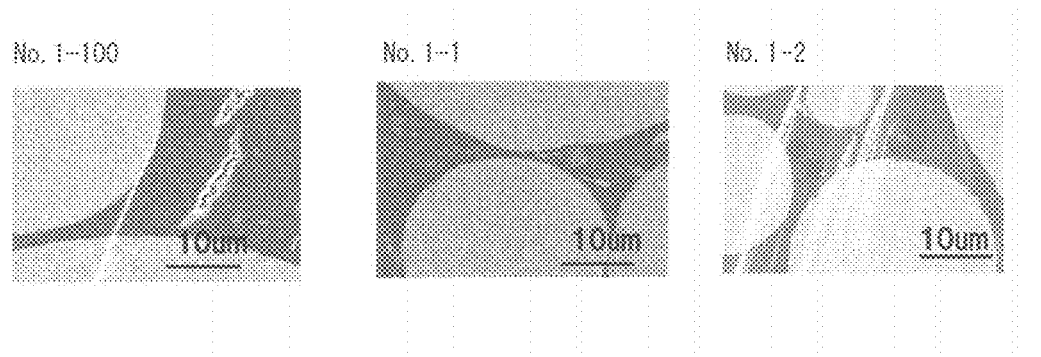
FIG. 2 shows scanning electron micrographs of observed cross sections of composite materials of Sample Nos. 1-1, 1-2, and 1-100 produced in Test Example 1.

A cross section of the composite material of each of the produced samples was obtained and observed under a SEM. FIG. 1 shows an image of the composite material of Sample No. 1-1 that was observed under the SEM. FIG. 2 shows, in order from the left, images of the composite material of Sample No. 1-100, the composite material of Sample No. 1-1, and the composite material of Sample No. 1-2 that were observed under the SEM. As shown in FIGS. 1 and 2, the composite materials of Sample Nos. 1-1 and 1-2 each included a soft magnetic powder 10 including relatively large powder particles 12 and relatively small powder particles 14, a filler 30 that was finer than the powder particles of the soft magnetic powder 10 and that contained rubber, and a resin portion 20 enclosing the soft magnetic powder 10 and the filler 30 dispersed therein.

In both of the composite materials of Sample Nos. 1-1 and 1-2, no fine cracks were observed in the resin portion 20. As shown in FIGS. 1 and 2, in this test, no fine cracks of 5 μm or more were present per area of 1200 μm². Therefore, it is considered that in both of the composite materials of Sample Nos. 1-1 and 1-2, substantially no fine cracks were present in the resin portion 20.

Moreover, in both of the composite materials of Sample Nos. 1-1 and 1-2, the soft magnetic powder 10 was uniformly dispersed throughout the entire composite material, and no aggregation was observed. Therefore, it is considered that substantially no aggregation was present.

Furthermore, as shown in FIGS. 1 and 2, in both of the composite materials of Sample Nos. 1-1 and 1-2, the filler 30 and the resin portion 20 were in intimate contact with each other with substantially no gap therebetween. In this test, all of the particles of the filler 30 that were present per cross-sectional area of 1200 μm² were in intimate contact with the resin portion 20. It is considered that the reason for this is that at least a portion of the coating portion of the additive used as the raw material melted in the resin, and thus the mixed ingredients (outer circumferential layers) including the ingredients of the coating portion and the ingredients of the resin portion were present around the rubber particles.

It is considered that Sample Nos. 1-3 and 1-4 also had similar structures to those of Sample Nos. 1-1 and 1-2.

On the other hand, in the composite material of Sample No. 1-100, a large number of fine cracks were present in the resin portion as shown in FIG. 2. In the image shown in FIG. 2, which was observed under the SEM, fine cracks having a length of 5 μm or more were present per area of 1200 μm². Moreover, in the composite material of Sample No. 1-100, no filler was present in the resin portion, and a portion (not shown) where powder particles of the soft magnetic powder 10 were in contact with each other was observed. It is considered that Sample Nos. 1-110 and 1-120 also had similar structures to that of Sample No. 1-100.

Measurement of Physical Quantities (Content and Average Particle Size) of Samples For each of the produced composite materials of Sample Nos. 1-1 to 1-4, the content of the soft magnetic powder with respect to the composite material and the average particle size of the soft magnetic powder were measured using the above-described image of the cross section observed under a SEM. Measurement was performed based on the measurement methods described in the section "Methods for Measuring Various Physical Quantities and the Like" above. As a result, differences of the content of the soft magnetic powder and the average particle size of the soft magnetic powder from the content and the average particle size of the soft magnetic powder used as the raw material were within ranges of ±5%, and it can be said that the content and the average particle size of the soft magnetic powder used as the raw material were substantially maintained.

Measurement of Magnetic Properties

For each of the composite materials of the samples, relative permeability (maximum relative permeability $\mu_m$), saturation magnetization (saturation magnetic flux density Bs), and iron loss were measured as magnetic properties. Table 2 shows the results.

With regard to saturation magnetization, a magnetic field of 10000 (Oe) (=795.8 kA/m) was applied to the ring-shaped test piece by using an electromagnet, and the saturation magnetization of the test piece when sufficiently magnetically saturated was measured.

The relative permeability was measured in the following manner. First, 300 turns of wire as a winding on the primary side and 20 turns of wire as a winding on the secondary side were wound around the ring-shaped test piece. Then, a B-H initial magnetization curve was measured. The B-H initial magnetization curve was measured within a range of H=0 (Oe) to 100 (Oe) (=7958 A/m), and a maximum relative permeability obtained from this B-H initial magnetization curve was used as the relative permeability. It should be noted that a magnetization curve as used herein refers to a so-called direct current magnetization curve.

The iron loss was measured in the following manner using the ring-shaped test piece. The hysteresis loss Wh1/20k (kW/m³) and the eddy-current loss We1/20k (kW/m³) at an excitation magnetic flux density Bm of 1 kG (=0.1 T) and a measuring frequency of 20 kHz were measured using an AC-BH curve tracer. The sum of the measured hysteresis loss and eddy-current loss was used as the iron loss W1/20k (kW/m³).

Measurement of Strength

As the strength of each of the composite materials of the samples, flexural strength was measured. Table 2 shows the results.

The flexural strength was obtained by conducting a three point flexural test on the plate-shaped test piece using a precision universal tester (Autograph AGS-H manufactured by Shimadzu Corporation). The distance between support points was set at 50 mm, and the test speed was set at 5 mm/min.

TABLE 2

| Sample No. | Density g/cm³ | Relative permeability $\mu_m$ | Saturation flux density Bs T | Iron loss (kW/m³) | | | Strength Flexural strength MPa |
|---|---|---|---|---|---|---|---|
| | | | | Iron loss (W1/20k) | Hysteresis loss (Wh1/20k) | Eddy-current loss (We1/20k) | |
| 1-100 | 5.71 | 25 | 1.37 | 668 | 495 | 173 | 53 |
| 1-1 | 5.72 | 22 | 1.37 | 578 | 451 | 127 | 87 |
| 1-2 | 5.74 | 23 | 1.37 | 585 | 445 | 140 | 85 |
| 1-110 | 5.74 | 25 | 1.27 | 222 | 153 | 69 | 80 |
| 1-3 | 5.71 | 23 | 1.27 | 215 | 147 | 68 | 83 |
| 1-120 | 5.73 | 24 | 1.26 | 237 | 165 | 72 | 58 |
| 1-4 | 5.73 | 22 | 1.26 | 226 | 156 | 70 | 69 |

Of the samples shown in Table 2, each of the composite materials of Sample Nos. 1-1 to 1-4, which included the soft magnetic powder, the specific filler, and the resin portion, had a long straight-line portion in the direct current magnetization curve and therefore had excellent direct current superposition characteristics, as compared with the respectively corresponding composite material of Sample Nos. 1-100, 1-110, and 1-120, which included no filler, the comparison being made between the composite materials having the same composition. With regard to all of Sample Nos. 1-1 to 1-4, the direct current magnetization curve had a substantially constant slope over a wide magnetic field range, or the relative permeability was substantially constant over a wide magnetic field range, so that the BH curve had excellent linearity, and therefore, it can be said that the relative permeability was made constant. Moreover, all of Sample Nos. 1-1 to 1-4 had low iron loss and high flexural strength, as compared with the respectively corresponding one of Sample Nos. 1-100, 1-110, and 1-120, the comparison being made between the samples having the same composition. Specifically, the composite materials of Sample Nos. 1-1 and 1-2 had an iron loss of not more than 650 kW/m³, particularly not more than (less than) 600 kW/m³, and more particularly not more than 590 kW/m³, and a flexural strength of not less than 60 MPa, particularly not less than 70 MPa, and more particularly not less than 80 MPa. Sample No. 1-3 had an iron loss of not more than 220 kW/m³ and a flexural strength of more than 80 MPa. Sample No. 1-4 had an iron loss of not more than 230 kW/m³ and a flexural strength of not less than 60 MPa.

With regard to Sample Nos. 1-1 to 1-4, the reason that the relative permeability was substantially constant over a wide magnetic field range is considered to be, for example, that the above-described soft magnetic powder was uniformly dispersed and that substantially no fine cracks were present in the resin portion. It is considered that magnetic flux disturbances due to a fine crack was unlikely to occur, and the passage of magnetic flux was likely to be uniform throughout the entire composite material. The composite materials of Sample Nos. 1-1 to 1-4 also had a low maximum relative permeability as compared with the respectively corresponding composite material of Sample Nos. 1-100, 1-110, and 1-120, the comparison being made between the composite materials having the same composition. Therefore, in the cases where the composite materials of Sample Nos. 1-1 to 1-4 are used for a magnetic core, the gap material can be omitted. In this respect as well, the composite materials of Sample Nos. 1-1 to 1-4 can contribute to construction of a magnetic core having excellent direct current superposition characteristics.

With regard to Sample Nos. 1-1 to 1-4, the reason for the low iron loss is considered to be, for example, that since the filler was contained (the additive having the two-layer structure was used), the introduction of strain into the soft magnetic powder during the manufacturing process was reduced, and thus the hysteresis loss was able to be reduced without removing strain by separately performing heat treatment, and that during the manufacturing process, the additive suppressed shrinkage of the resin, the filler served as a spacer, and thus the soft magnetic powder was uniformly dispersed and contact between the powder particles was reduced, so that an increase in the eddy-current loss due to contact between the powder particles was able to be suppressed. Moreover, it is considered that since the soft magnetic powder composed of the Fe—Si alloy was used, the introduction of strain was also reduced by the stiffness of the alloy itself.

With regard to Sample Nos. 1-1 to 1-4, the reasons for the high flexural strength is considered to be, for example, that since the filler was contained (the additive having the two-layer structure was used), the development of fine cracks in the resin portion due to shrinkage during solidification in the manufacturing process was able to be reduced, and that due to the above-described uniform dispersion of the soft magnetic powder, no locally weak portions were formed, and thus, the composite material was able to have uniform strength throughout its entirety.

Furthermore, even though the filler was contained, each of the composite materials of Sample Nos. 1-1 to 1-4 had high saturation magnetization, which was almost equal to that of the respectively corresponding composite material of Sample Nos. 1-100, 1-110, and 1-120, which contained no filler, the comparison being made between the composite materials having the same composition. Specifically, the composite materials of Sample Nos. 1-1 and 1-2 had a saturation magnetization of not less than 1.2 T, particularly not less than 1.3 T, and more particularly not less than 1.35 T, and the composite materials of the Sample Nos. 1-3 and 1-4 had a saturation magnetization of not less than 1.2 T and particularly not less than 1.25 T. The reason for the high saturation magnetization is considered to be, for example, that the particles of the filler were sufficiently smaller than the soft magnetic powder particles (here, not more than $1/10$ and particularly not more than $1/15$ of the average particle size of the soft magnetic powder), and the filler was therefore able to be disposed in gaps created by the powder particles of the soft magnetic powder and thereby prevent a decrease in magnetic properties. Moreover, the composite materials of Sample Nos. 1-1 to 1-4, whose resin portion was substantially composed of thermoplastic resin, was satisfactorily molded, even though the filling ratio of the soft magnetic powder was as high as 70 vol % or more.

Furthermore, from this test, it can be said that a composite material which has excellent direct current superposition characteristics, low iron loss, and high strength and in which a soft magnetic powder is uniformly dispersed and a resin portion has extremely few fine cracks, and furthermore, the composite material having high saturation magnetization can be manufactured by using, as the raw material, the above-described additive having the two-layer structure and composed mainly of rubber. Also, it can be said that excellent moldability (fluidity of materials) can be achieved by adjusting the size of the additive particles and the amount of the additive that is to be added, and the above-described composite material can therefore be easily manufactured with a high degree of precision.

Core for Magnetic Component

At least a portion of a magnetic core for a magnetic component according to an embodiment includes the composite material 1 according to the foregoing embodiment, for example, the composite material of any of Sample Nos. 1-1 to 1-4 produced in Test Example 1. This magnetic core may have various shapes depending on the form of the magnetic component. For example, in the case where the magnetic core forms a closed magnetic circuit, an integrally molded product having an annular portion or an annular-shaped combined product formed by combining a plurality of core pieces together may be used. The above-described integrally molded product may have a circular annular shape, an O-shape, or the like. With regard to the above-described combined product, cores having known shapes, called an EE core, an ER core, an EI core, and the like, and cores having an O-shape (FIGS. 3 and 4) formed by combining core pieces having column shapes such as rectangular parallelepiped shapes together may be used. For example, in the case where the magnetic core forms an open magnetic circuit, a bar may be used.

All of the above-described integrally molded product, combined product, and bar are independent of a coil, and a separately produced coil may be assembled thereto, or a wire may be wound thereon. In addition to these, the composite material 1 according to the foregoing embodiment can also be included in a magnetic core for a magnetic component, the magnetic core being integrally equipped with a coil in a state in which at least a portion of the coil is covered by the magnetic core or the coil is embedded in the magnetic core. This magnetic component can be easily manufactured by placing the coil in the shaping mold in advance, filling the melt mixture described in the section "Method for Manufacturing Composite Material" above into the shaping mold, and thereby embedding, for example, the coil.

The magnetic core for a magnetic component according to the embodiment includes the composite material 1 according to the foregoing embodiment having excellent direct current superposition characteristics, low iron loss, and high strength, and therefore has excellent direct current superposition characteristics, low loss, and high strength. In particular, when the entire magnetic core is composed of the composite material 1, the gap material can be omitted, and the magnetic core has even more excellent direct current superposition characteristics.

Reactor

The reactor 1A of an embodiment will be described with reference to FIGS. 3 and 4. The reactor 1A includes a coil 2A having a winding portion formed by helically winding a wire 2w, and a magnetic core 3A having a portion on which the winding portion of the coil 2A is disposed. The reactor 1A includes the composite material 1 (see the inside of the dashed circle in FIG. 3) according to the foregoing embodiment, for example, the composite material of any of Sample Nos. 1-1 to 1-4 produced in Test Example 1, in at least a portion of the magnetic core 3A.

In the reactor 1A shown in this example, the coil 2A has a pair of winding portions 2a and 2b, and the magnetic core 3A includes portions (core pieces 31, 31) that are placed inside the respective winding portions 2a and 2b and portions (core pieces 32, 32) that are not placed inside the winding portions 2a and 2b and are exposed. All of the core pieces 31 and 32 (31, 31, 32, 32) are composed of the composite material 1.

Coil

A coated wire can be used as the wire 2w constituting the coil 2A, the coated wire including a conductor wire and an insulating coating made of enamel (typically, polyamideimide) or the like and provided on an outer circumference of the conductor wire. A rectangular wire or a round wire made of a conductive material, such as copper, aluminum, or an alloy thereof, may be used as the conductor wire. The specifications (number of winding portions, end face shape of winding portions, number of turns, and the like) of the coil 2A can be selected as appropriate. In the coil 2A shown in FIGS. 3 and 4, the wire 2w is a coated rectangular wire, and the coil 2A includes the winding portions 2a and 2b formed by helically winding a single continuous wire 2w having no joint portion, and a connecting portion 2r connecting these winding portions to each other. The winding portions 2a and 2b are each formed as an edgewise coil. A configuration can also be adopted in which the coil includes only a single winding portion.

Magnetic Core

The magnetic core 3A shown in FIGS. 3 and 4 is a combined product formed by combining a plurality of column-shaped core pieces 31 and 32 (31, 31, 32, 32) together into an annular shape, and forms a closed magnetic circuit when the coil 2A is excited. The magnetic core 3A composed of the composite material 1 may have, for example, a saturation magnetization of 0.6 T or more and particularly 1.0 T or more, and a relative permeability of not less than 5 nor more than 50 and particularly not less than 10 nor more than 35 (for the measurement methods, see Test Example 1 described above). When the relative permeability is within this range, the non-magnetic materials such as the resin portion 20 in the composite material 1 can be used as a magnetic gap, and the necessity for separately providing a gap material between the core pieces is eliminated. That is to say, a reactor 1A in which the gap material is omitted can be obtained. It should be noted that depending on the magnetic properties of the core pieces, a magnetic core separately including a gap material made of alumina or the like can be obtained.

Others

The reactor 1A may also include a intervening member (not shown) that is disposed between the coil 2A and the magnetic core 3A and that insulates the coil 2A and the magnetic core 3A from each other. The intervening member can be composed of an insulating material.

Effects

Since at least a portion of the magnetic core 3A (here, the entire magnetic core 3A) of the reactor 1A according to the embodiment is composed of the composite material 1 according to the foregoing embodiment having excellent direct current superposition characteristics, low iron loss, and high strength, the reactor 1A according to the embodiment has excellent direct current superposition characteristics, low loss, high strength, and excellent magnetic properties, and is highly reliable in terms of strength. In particular, when the entire magnetic core 3A is composed of the composite material 1 and does not include any gap material, the reactor 1A has even more excellent direct current superposition characteristics.

Converter•Power Conversion Device

The above-described reactor 1A can be applied to uses where the energization conditions are, for example, maximum current (direct current): about 100 A to 1000 A, average voltage: about 100 V to 1000 V, and working frequency: about 5 kHz to 100 kHz. Typical examples of such uses include a constituent component of a converter 1110 (FIGS. 5 and 6) to be installed in a vehicle 1200 (FIG. 5), such as an electric automobile or a hybrid automobile, and a constituent component of a power conversion device 1100 (FIGS. 5 and 6) provided with the converter 1110. Hereinafter, schematic configurations of the vehicle 1200, the power conversion device 1100, and the converter 1110 will be described.

Figure 5:
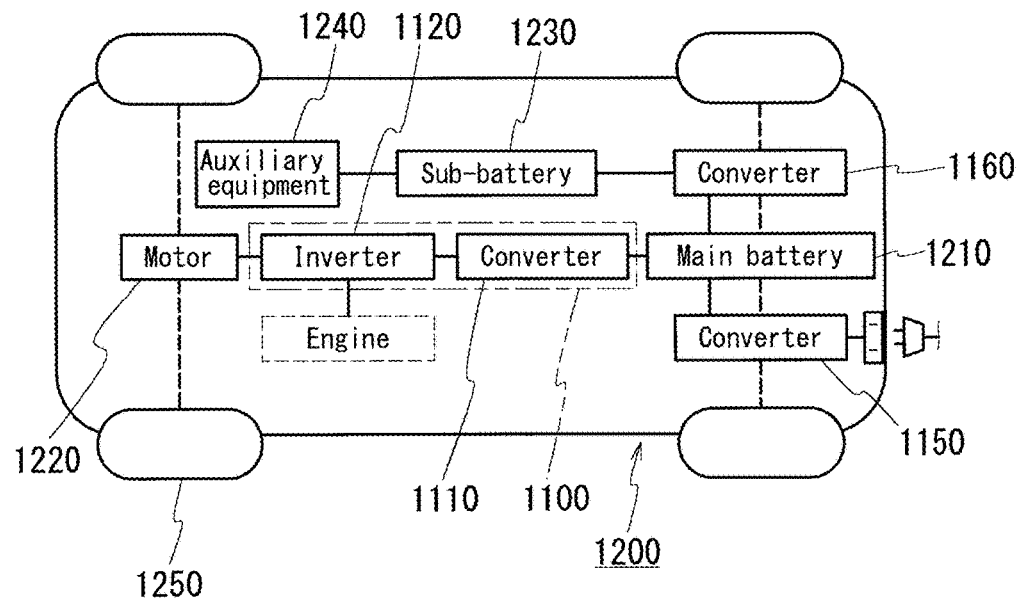
FIG. 5 is a schematic configuration diagram schematically showing a power supply system of a hybrid automobile.

The vehicle 1200 includes, as shown in FIG. 5, a main battery 1210, the power conversion device 1100 connected to the main battery 1210, a motor (typically, three-phase alternating current motor) 1220 that is driven by power supplied from the main battery 1210, and wheels 1250 that are driven by the motor 1220 and used for travelling. In the case of a hybrid automobile, the vehicle 1200 further includes an engine. In addition to these, the vehicle 1200 includes a converter 1150 for a power feeding device, the converter 1150 being connected to the main battery 1210, a converter 1160 for an auxiliary equipment power supply, the converter 1160 being connected to a sub-battery 1230, which serves as a power source for auxiliary equipment 1240, and the main battery 1210, and the like. The converters 1150 and 1160 typically perform voltage increasing and decreasing operations of AC-DC conversion.

The power conversion device 1100 includes the converter 1110 that is connected to the main battery 1210 and an inverter 1120 that is connected to the converter 1110 and that converts direct current to alternating current and vice versa.

Figure 6:
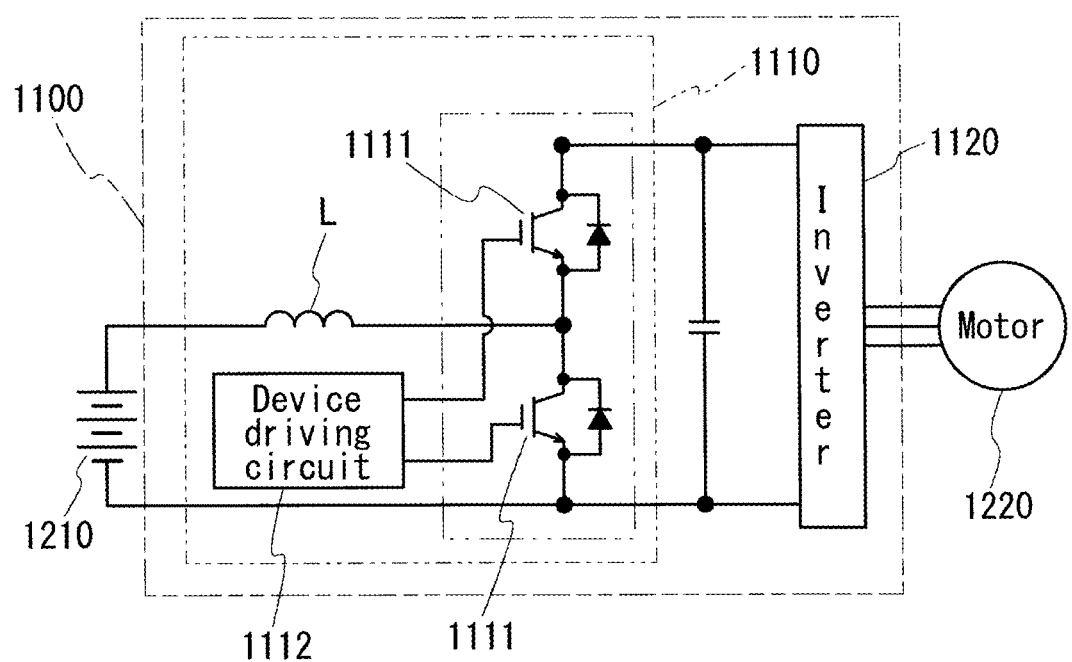
FIG. 6 is a schematic circuit diagram illustrating an example of a power conversion device including a converter.

As shown in FIG. 6, the converter 1110 includes a plurality of switching elements 1111, a driving circuit 1112 that controls the operation of the switching elements 1111, and a reactor L that is connected to the main battery 1210 and the switching elements 1111. The converter 1110 converts an input voltage by repeatedly turning ON/OFF the switching elements 1111. The converter 1110 of this example performs voltage increasing and decreasing operations of DC-DC conversion between the main battery 1210 and the inverter 1120. A configuration can also be adopted in which the converter 1110 is a converter that performs only a voltage increasing operation or only a voltage decreasing operation.

The above-described reactor 1A can be included as the reactor L of the converter 1110 and reactors (not shown) included in the above-described other converters 1150 and 1160. Since the power conversion device 1100 and the converter 1110 include the reactor 1A constituted by the magnetic core 3A including the composite material 1 having excellent direct current superposition characteristics, low iron loss, and high strength, the power conversion device 1100 and the converter 1110 have excellent direct current superposition characteristics, low loss, high strength, and excellent magnetic properties, and is highly reliable in terms of strength.

The present invention is not limited to these examples and is defined by the appended claims, and all changes which come within the meaning and range of equivalency of the claims are intended to be embraced therein.

INDUSTRIAL APPLICABILITY

The composite material according to the present invention can be used for a magnetic core of various types of magnetic components such as, for example, reactors, choke coils, transformers, and motors, and also a magnetic material or the like that is desired to have excellent direct current superposition characteristics, low loss, high strength, and furthermore, high saturation magnetization. The magnetic core for a magnetic component according to the present invention can be used as a constituent element of a reactor, a choke coil, a transformer, a motor, or the like. The reactor according to the present invention can be used as a constituent component of various types of converters, such as in-vehicle converters (typically, DC-DC converters) to be installed in vehicles such as hybrid automobiles, plug-in hybrid automobiles, electric automobiles, and fuel-cell electric automobiles and converters for air conditioners, as well as power conversion devices.

The invention claimed is:

1. A magnetic core for a magnetic component, the magnetic core comprising:
a composite material, the composite material having a soft magnetic powder, a filler, and a resin portion, the resin portion enclosing the soft magnetic powder and the filler, the filler dispersed within the resin portion, wherein the filler includes a rubber particle and an outer circumferential layer, the outer circumferential layer covering a surface of the rubber particle, the outer circumferential layer including an organic substance, and the resin portion including a thermoplastic resin, the outer circumferential layer isolating the rubber particle from the resin portion, wherein the composite material contains the filler in an amount of more than 0 volume percentage and less than 7 volume percentage and wherein the composite material contains the soft magnetic powder in an amount of not less than 30 volume percentage nor more than 80 volume percentage.

2. The magnetic core according to claim 1, wherein particles of the filler that are present per cross-sectional area of 1200 μm$^2$ of the composite material are each in intimate contact with the resin portion.

3. The magnetic core according to claim 1, wherein the filler contains at least one of a silicone rubber and an acrylic rubber.

4. The magnetic core according to claim 1, wherein the filler has an average particle size of not less than 10 nm nor more than 10 μm.

5. The magnetic core according to claim 1, wherein the soft magnetic powder contains an alloy powder of an iron-base alloy having a silicon content of not less than 1.0 mass percentage nor more than 8.0 mass percentage.

6. The magnetic core according to claim 1, wherein the soft magnetic powder has an average particle size of not less than 50 μm nor more than 300 μm.

7. A reactor comprising:
a coil formed by winding a wire; and
a magnetic core on which the coil is disposed,
wherein the magnetic core comprises the composite material according to claim 1.

8. A converter comprising the reactor according to claim 7.

9. A power conversion device comprising the converter according to claim 8.

* * * * *